United States Patent [19]

Klein

[11] Patent Number: 4,699,436
[45] Date of Patent: Oct. 13, 1987

[54] BRAKE SYSTEM FOR AUTOMOTIVE VEHICLES

[75] Inventor: Hans C. Klein, Hattersheim, Fed. Rep. of Germany

[73] Assignee: ITT Industries, Inc., New York, N.Y.

[21] Appl. No.: 913,553

[22] Filed: Sep. 26, 1986

Related U.S. Application Data

[63] Continuation of Ser. No. 593,520, Mar. 26, 1984, abandoned.

[30] Foreign Application Priority Data

Apr. 7, 1983 [DE] Fed. Rep. of Germany ....... 3312443
Jun. 29, 1983 [DE] Fed. Rep. of Germany ....... 3323402

[51] Int. Cl.$^4$ .......................... B60T 8/26; B60T 8/02
[52] U.S. Cl. .................................. 303/114; 303/119
[58] Field of Search ............... 303/6 C, 115, 114, 113, 303/119, 116, 109, 108, 84 R, 84 A, 96; 188/181 A, 181 C, 345

[56] References Cited

U.S. PATENT DOCUMENTS

| | | | |
|---|---|---|---|
| 3,667,813 | 6/1972 | Burckhardt et al. | 303/96 |
| 3,768,874 | 10/1973 | Riordan | 303/114 |
| 3,980,344 | 9/1976 | Burckhardt | 303/119 |
| 3,980,346 | 9/1976 | Leiber | 303/6 |
| 4,033,635 | 7/1977 | Montoya | 303/109 |
| 4,170,066 | 10/1979 | Blomberg et al. | 303/116 |
| 4,418,966 | 12/1983 | Hattwig | 303/119 |

FOREIGN PATENT DOCUMENTS

| | | | |
|---|---|---|---|
| 0062246 | 10/1982 | European Pat. Off. | 303/119 |
| 1961039 | 6/1971 | Fed. Rep. of Germany. | |
| 3137200 | 3/1983 | Fed. Rep. of Germany. | |
| 3136616 | 3/1983 | Fed. Rep. of Germany. | |
| 0004970 | 1/1977 | Japan | 303/116 |
| 1185354 | 3/1970 | United Kingdom. | |
| 1242199 | 8/1971 | United Kingdom. | |
| 1346678 | 2/1974 | United Kingdom. | |
| 1394329 | 5/1975 | United Kingdom. | |
| 1431466 | 4/1976 | United Kingdom. | |
| 1461166 | 1/1977 | United Kingdom. | |
| 2065807 | 7/1981 | United Kingdom | 303/119 |
| 2073347 | 10/1981 | United Kingdom. | |
| 2086508 | 5/1982 | United Kingdom | 303/114 |

Primary Examiner—John W. Caldwell, Sr.
Assistant Examiner—Alvin Oberley
Attorney, Agent, or Firm—James B. Raden; Robert P. Seitter

[57] ABSTRACT

A pressurized fluid brake system for automotive vehicles of the type where the brake pedal pressure (F) is transmitted with assistance of an auxiliary pressure force to the wheel brake cylinders through pressure lines containing pressure modulator valves. The wheels are provided with transducers for measuring instantaneous wheel rotation as well as vehicle velocity. Electronic control circuitry processes and logically combines the measured values to generate control signals for the pressure modulator valves. Preferably, the modulator valves are electromagnetically actuatable valves. By virtue of the braking pressure modulator valves, brake force distribution is controlled in dependence upon the brake slip of the front wheels and, in addition, a brake slip preventing locking of the vehicle wheels will be performed.

4 Claims, 4 Drawing Figures

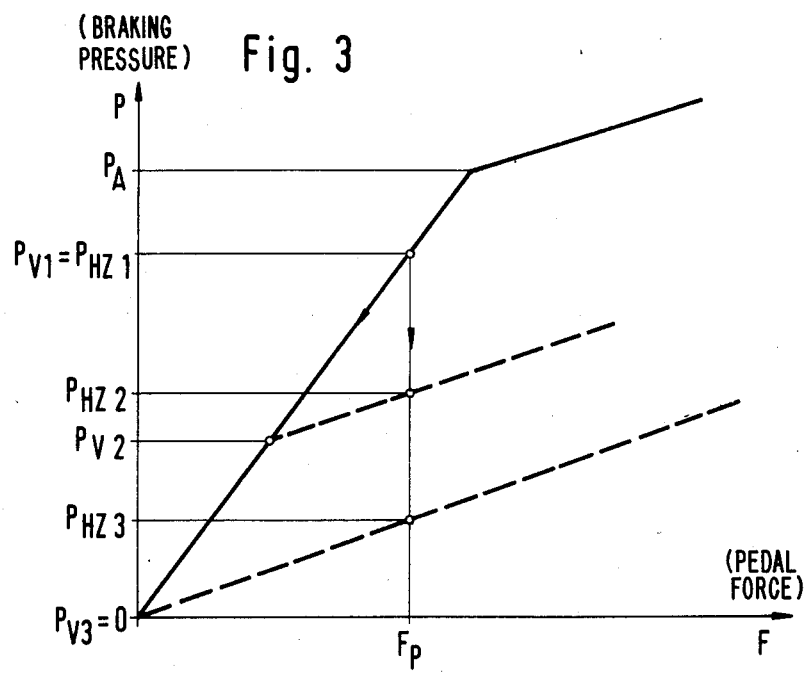
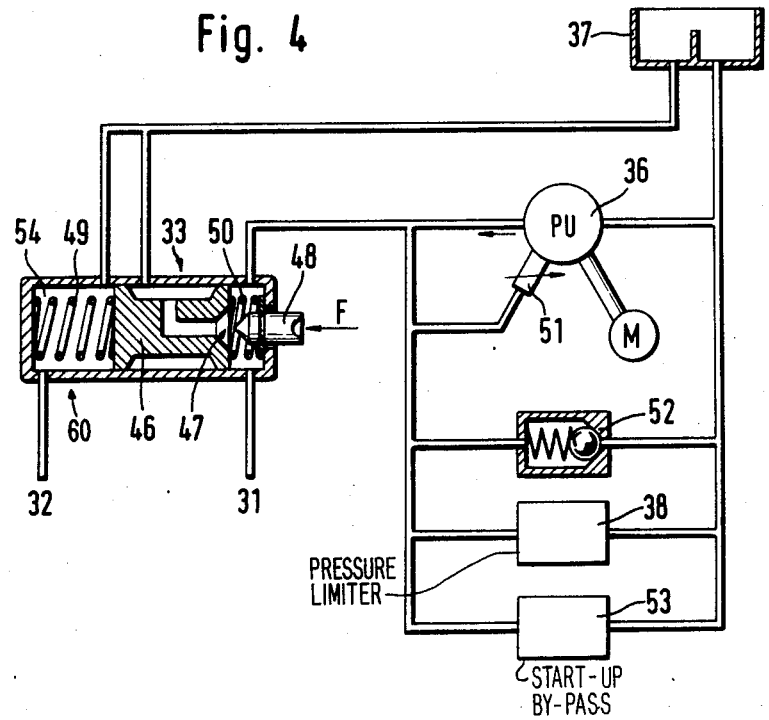

BRAKE SYSTEM FOR AUTOMOTIVE VEHICLES

This is a continuation of U.S. patent application Ser. No. 06/593,520 filed Mar. 26, 1984, now abandoned.

BACKGROUND OF THE INVENTION

The present invention relates to a pressurized fluid brake system for vehicles, particularly road vehicles, of the type wherein the brake pedal pressure is assisted by an auxiliary force and transmitted to the wheel brake cylinders via pressure fluid lines in which braking pressure modulators are inserted to regulate the braking pressure. Such brake systems are generally equipped with transducers for the direct and/or indirect measurement of each wheel's rotational behavior and the vehicle's velocity. These systems also employ electronic circuits which process and logically combine the measured values in order to generate control signals for the braking modulators.

Numerous brake systems of this type are already known for preventing locking of all or particular wheels. Typically, they have control electronics which monitor constantly measured wheel rotational behavior and vehicle velocity, or their timevariations. Upon detecting that locking is imminent, the control electronics reduce the braking pressure at the wheel concerned by means of the modulators, maintaining this reduced pressure constant and then increasing it again at an appropriate time. This adjusts the wheel brake slip to a value favorable for slowing down the vehicle while maintaining driving stability and steerability. As for adherence of the wheels to the road, the obtainable coefficient of friction as well as the forces occurring at the wheel during braking depend on a great many parameters. Because the most important of these parameters vary widely, such antilocking or brake slip control systems are relatively complicated in design. This is a disadvantage because when a vehicle is driven cautiously its brake slip control apparatus seldom takes up work, except in emergency or panic stops. Because of this, it is rarely apparent whether the antilocking protection is working. Therefore, the antilocking apparatus has to be checked by additional devices at specific intervals, e.g. at each start-up of the vehicle's motor, or at certain preset times, so possible errors will be recognized in time.

When engineering the performance specifications of such brake systems, another problem is the adaptation of the brake force distribution to the static and dynamic loads on the vehicle axles. Conventional brake force distributors are limited to an invariably adjusted, pressure-responsive control. Load-responsive or deceleration-responsive brake force regulators are likewise known in several variants. But all of them permit only a relatively rough approximation to the axle load distribution, and at most in one of the two limit conditions, "unloaded" or "loaded".

Likewise, a computerized brake force distributor system is known in which with the vehicle at a standstill the static axle load distribution is measured by sensors and input to an onboard microcomputer. The microcomputer uses these measured static axle load values and the value of the braking pressure to control the brake force distribution in the front and rear axle circuits pursuant to a formula stored in a memory device (European patent application EP-A1 062246). Such a brake force distributor has the disadvantage that the microcomputer uses only a calculated value of the braking friction between the wheels and the road at the front and rear axles, not the actual friction values prevailing during braking. Yet such actual friction values depend on a great number of parameters and can affect the brake force distribution. Therefore, to reliably preclude dangerous overbraking of the rear axle, the designer generally cautiously engineers the brake system so that in the majority of cases the contribution of the rear axle wheels to the vehicle braking is small. Furthermore, the actual wheel-to-road friction values occurring in practical operations have been found to differ widely from the nominal values arrived at by preset calculations.

The brake characteristic values assumed as constant when engineering and dimensioning the brake force distribution and the mathematical formula stored in the computer's memory are in practice subject to considerable variation. For example, variation arises from manufacturing tolerances, aging of parts, contamination, changes of the spring constants, adjustment defects, and changes in temperature, etc. For this reason, it has been proposed that the actual brake slip at the front and rear wheels be determined with the aid of wheel and vehicle sensors together with logic circuits. Then the brake slip at the rear axle can be made dependent upon the brake slip at the front axle so that during braking the coefficient of friction occurring at the rear wheels will be about, or somewhat lower than, that of the front wheels (German Pat. No. 3301948).

Conventional brake force regulators are typically designed so that in the majority of cases first the front wheels, and only then the rear wheels, will lock when overbraked. This is because the locking of the rear wheels brings about a high risk of skidding while locking of the front wheels reduces steerability. The loss in steerability due to front wheel locking is considered the lesser of two evils in comparison to an imminent danger of skidding. It is true that usually the major brake load occurs on the front axle on account of the dynamic axle load distribution. But if the braking forces at the rear axle are too low or the potentially available coefficient of friction at the rear wheels is underutilized, the stopping distance will be correspondingly longer under certain conditions, e.g. on slippery roads. Moreover, when the brake pedal pressure is inceased too heavily beyond a minor pedal pressure on a slippery road, none of the brake force distributors described is able to prevent both front and the rear wheels from locking, causing the vehicle to lose both its steerability and driving stability.

Therefore, an object of the present invention is to overcome these disadvantages by providing a brake system which, with comparatively little effort, optimally distributes the brake force between the front and rear wheels under all conditions to be met in practical operations. Such a system acheives a uniform exploitation of available friction at both the front and rear axles and prevents locking of the wheels. It also reliably precludes the imminent danger of skidding and loss of steering ability.

SUMMARY OF THE INVENTION

This object is achieved by a simple, technically advanced improvement of a power brake system. The braking pressure modulator valves control the brake force distribution, i.e. the distribution of the braking pressure between the front and the rear wheels, in dependence on the brake slip of the front wheels. The modulator valves also perform a brake slip control to prevent locking of all or some wheels. The brake slip control starts to operate when a locked condition becomes imminent at at least one wheel.

Brake slip control devices of the prior art do not start service until some wheel, or a particular wheel monitored, becomes unstable. They have no influence whatsoever on "normal" braking actions. The present invention enables by substantially the same means (1) to control the brake force distribution onto the front and the rear axles during each braking action, and (2) to control the brake slip in the event of too heavy brake pedal depression. Such dangerous overapplication of the brake pedal occurs in panic stops and on very slippery roads. In such a situation, an anti-locking system must enable all wheels, or the controlled wheels, to remain capable of braking and contributing to driving stability and steerability. Certain conventional construction elements already required for conventional brake slip control only need to be somewhat modified or switched differently and logically combined according to the embodiments shown. The result is a brake force distribution optimal for each braking action. In each case the actual brake slip at the front wheels, not a calculated or a once determined slip value, is determined. The invention thus enables a uniform coefficient of friction to be obtained at the wheels of the front and rear axles. Parameters that can change the preset brake force distribution, such as axle load distribution, aging, contamination, temperature changes, etc., directly affect the brake slip. Therefore, their effects will likewise be considered directly by the control circuit, since it determines actual brake slip. There is no need for separate brake force distributors as conventionally additionally required even when employing brake slip regulators.

An inventive brake system requiring comparatively little manufacturing effort comprises a dual-circuit power brake booster connected to an auxiliary energy source. The two brake circuits connected to the booster are each directly connected to the brake cylinder of a front wheel and each indirectly connected to the brake cylinder of a respective rear wheel through a respective braking pressure modulator. Each modulator can be, for example, an electromagnetically actuatable two-way/two-position directional control valve inserted into the inlet pressure fluid line leading to the rear wheel brake cylinder. Such a system can also have one or more electromagnetically actuatable pressure outlet valves. The outlet valves open the pressure fluid discharge to a compensating reservoir, decreasing the braking pressure at the rear wheels. Switching means can be provided for affecting the braking pressure at the front wheels by varying the auxiliary energy introduced into the power brake booster. In this arrangement, a diagonal split-up of the two brake circuits will be of advantage in some cases.

A substantially ideal brake force distribution between the front and rear axles can be maintained during a braking action with the aid of the individual braking pressure modulators. In particular, during normal braking solenoid valves, inserted in the hydraulic pressure fluid lines leading to the rear wheel, can be used for brake force distribution. To this end, the control signals will be generated in a conventional fashion by inputting signals measuring the wheel rotational behavior, combining the signals obtained and comparing them with the vehicle velocity. The dynamic and static axle load distributions as well as variations in the brake characteristic values are thus taken into consideration. The road conditions and the instantaneous friction or coefficient of friction at front and rear wheels respectively are also considered. A brake pressure decrease at the rear axle brake cylinders is required for the brake slip control. This is accomplished by means of one or two solenoid valves of simple design. For the decrease of the pressure in the front-wheel brake cylinders during the brake slip control phases, likewise a two-way/two-position directional control valve will suffice. When employing an open-center booster, the control system will have to temporarily throttle or short-circuit the auxiliary force that boosts the pedal force.

The open-center booster employed according to a particularly straightforward embodiment of the present invention does not require a high-quality pressure accumulator. At most, it requires a fluid buffer store with relatively small capacity. When the brake pedal is applied, the driving motor of the pump assembly will be started or speeded up and after a relatively brief time will make available the auxiliary force required.

Furthermore, the normally closed valves in the pressure fluid lines leading to the wheel brake cylinders of the rear wheels can be switched open by means of a pulse train dependent on the amounts of brake slip and braking pressure, or the braking pressure rise, at the front wheels. In this arrangement, the pulse duration to pulse space ratio (duty cycle), or the pulse train frequency, may be variable in response to the braking pressure rise at the front wheels.

Further advantages and details of the present invention can be taken from the following description of embodiments of this invention with reference to the accompanying drawings.

BRIEF DESCRIPTION OF THE DRAWINGS

In the drawings:

FIG. 3 is a diagram of how the braking pressure variation in each brake circuit depends upon the brake pedal force in the brake system of FIG. 2; and FIG. 4 is a block diagram of the basic fluid circuit of the open-center booster of the brake system of FIG. 2.

DETAILED DESCRIPTION

Figure 1:
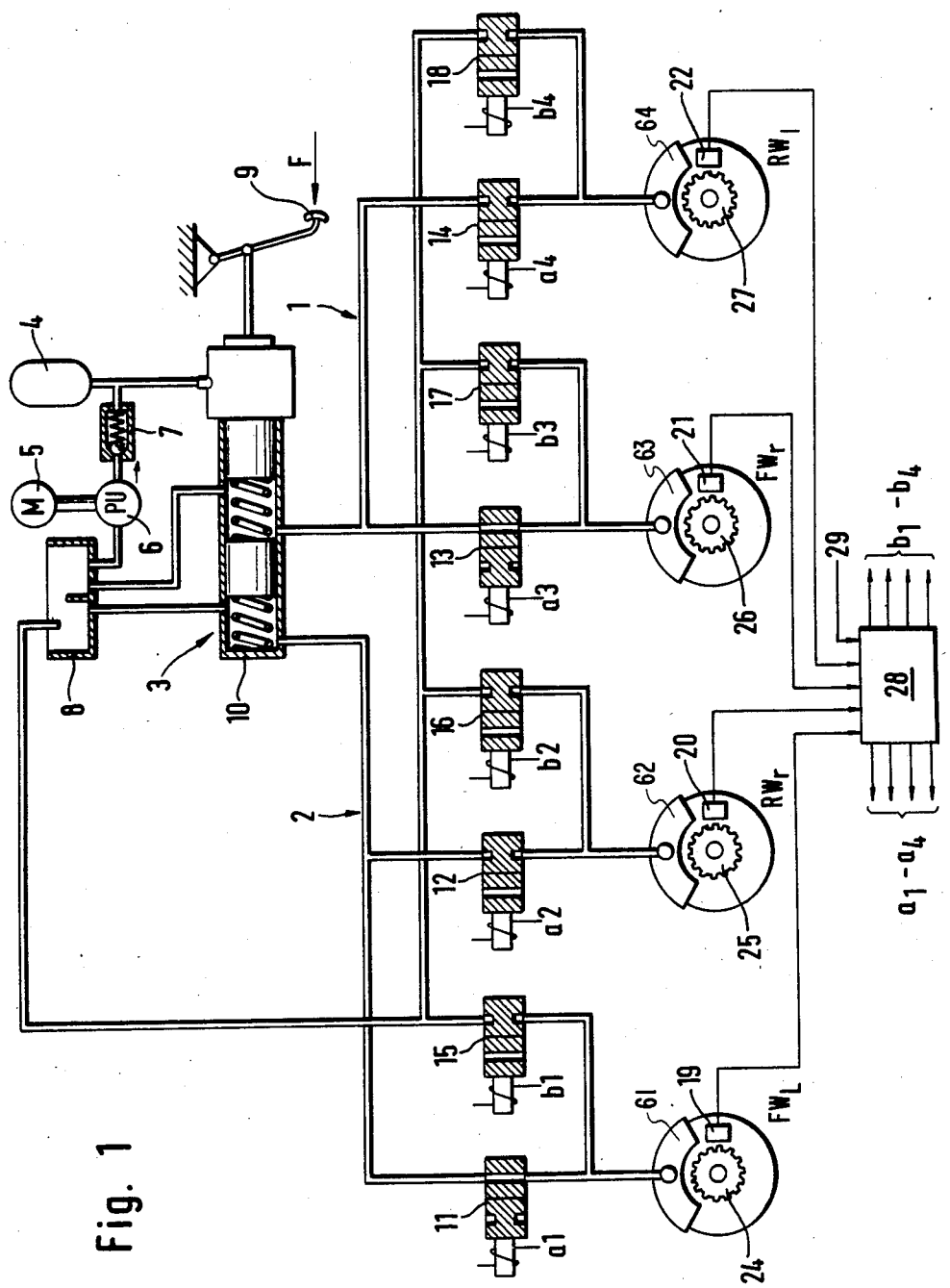
FIG. 1 is a schematic view of a dual circuit hydraulic brake system of the inventive type in its normal state in which braking pressure can be applied to the front wheel brake cylinders but normally closed valves must be activated to apply pressure to the rear wheel brake cylinders.

The basic principle of the inventive brake system is shown in FIG. 1. This embodiment of the invention represents a dual-circuit hydraulic brake system with diagonal allotment of the wheels to the brake circuits 1 and 2.

A power brake pressure booster 3 is supplied with auxiliary energy by a hydraulic pressure accumulator 4. A pump 6, driven by an electric motor 5, is for charging and topping up the pressure accumulator 4. The pump's pressure side communicates via a check valve 7 with accumulator 4 and an inlet to pressure booster 3. The suction side of pump 6 leads directly to a supply or compensating fluid reservoir 8 for the hydraulic pressure fluid. The vehicle driver inputs a pedal force F to booster 3 via a brake pedal 9.

Two brake fluid circuits 1 and 2 are connected to chambers of a tandem master cylinder 10. Master clyinder 10 is acted upon by the driver's pedal force F as assisted by the auxiliary pressure force from the pump and accumulator. According to the embodiment of FIG. 1, each of the pressure fluid lines leading to the individual wheel brake cylinders 61, 62, 63 and 64 has a two-way/two-position directional control valve 11, 12, 13, and 14 which serves as an inlet valve. Each wheel's wheel brake cylinder 61, 62, 63, and 64 is connected back to the supply or pressure compensating reservoir 8 via another two-way/two-position directional control valve 15, 16, 17 and 18. Thus valves 15 through 18 serve as pressure outlet valves.

The rotation of the individual wheels is measured by inductive transducers 19 through 22 and signaled to an electronic circuit block 28. Each front $FW_l$, $FW_r$ and rear $RW_l$, $RW_r$ wheel has an associated toothed metal disc 24–27, whose passing teeth induce voltage impulses in the respective adjacent inductive sensor. Consequently, the output pulse train frequency of the sensed pulses of each transducer is proportional to the rotational speed of its respective wheel.

An electronic circuit block 28 electronically processes, combines, and evaluates the measured wheel rotation speed values in a conventional fashion to generate switching or controlling signals for the two-way valves 11–18. If desired, for determining the velocity measurement of the vehicle itself an additional sensor can be connected to an input 29 of circuit block 28. However, a computed value approximating the vehicle velocity can also be computed from the signals supplied by the wheel rotation transducers 19 through 22, since these sensor signals contain data related to each wheel's velocity, acceleration, and deceleration. The output electric control signal lines which connect to the exciter coils $a_1$–$a_4$ and $b_1$–$b_4$ of valves 11–14 and 15–18 are merely indicated in FIG. 1 with a view to improving the clarity of the illustration.

The switching positions of control valves 11 through 18 are illustrated in FIG. 1 in the de-energized state in which each valve assumes its specified inactive (normal) position. Hence, upon application of the brake, at first only the brake cylinders 61, 63 of the two front wheels $FW_l$ and $FW_r$ directly communicate via normally-open valves 11 and 13 with respective working chambers of the tandem master cylinder 10. Therefore, at first braking pressure only develops in the front wheels $FW_l$, $FW_r$. In contrast to the front cylinders 61, 63, the share of the braking pressure allotted to the rear wheel brake cylinders 64, 62 of rear wheels $RW_l$ and $RW_r$ depends on the actuation of inlet valves 12 and 14, which are closed when de-energized. The braking pressure distribution, i.e., the distribution of braking pressure between the front and rear wheels, can therefore be controlled in both brake circuits 1, 2 by timed or pulsed actuation and switching over of valves 12 and 14 in a manner calculated as necessary by the logic contained in the control circuit block 28.

The inlet valves 11 and 13 leading to the left and right front-wheel brake cylinders as well as their corresponding outlet valves 15 and 17 will not start switching over until the rotational behavior of one or more wheels indicates a locked condition is imminent. Switching over (closing) of front inlet valves 11, 13 or switching back (closing) of rear inlet valves 12, 14 into their inactive position prevents further pressure increase in the wheel brake cylinders of the wheel or wheels in danger of becoming unstable. If needed, the braking pressure may even be decreased to a desired level by opening outlet valves 15–18 if the corresponding inlet passages 11–14 are closed at the same time. Furthermore, if desired a dynamic inflow of hydraulic pressure fluid into brake circuits 1 and 2 can be effected by controlling additional outlet valves (not shown) contained in the power brake booster 3. This enables sufficient pressure fluid to remain available for a new build-up of braking pressure even after repeated pressure decreases via outlet valves 15–18.

Instead of the diagonal brake circuit split-up of FIG. 1, a right/left or front axle/rear-axle split-up may also be selected according to the same principle. It will also likewise be possible to realize three or four hydraulic brake circuits by establishing one or more dynamic brake circuits via a booster valve in a known fashion.

Figure 2:
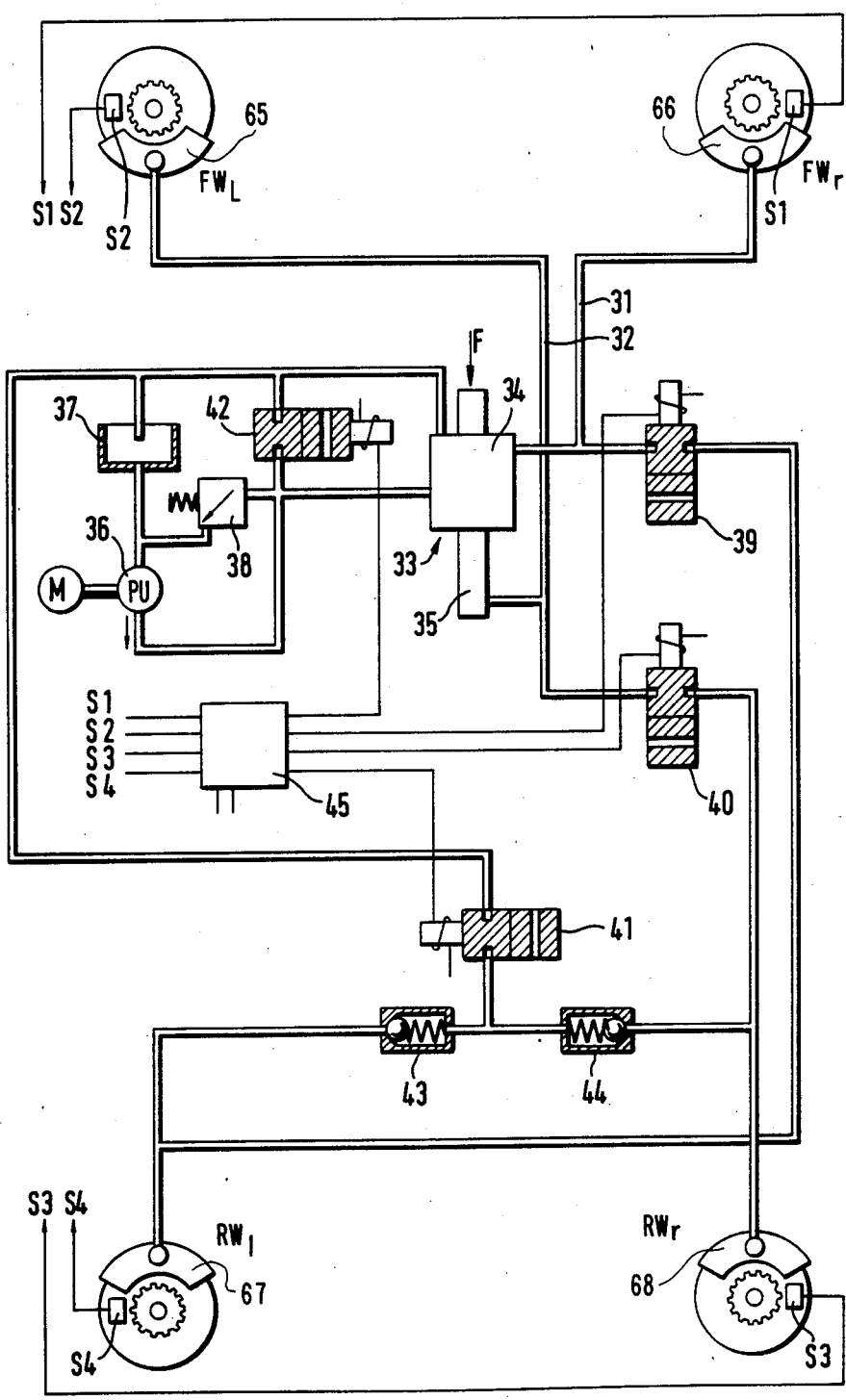
FIG. 2 shows another embodiment of the invention in which an open-center pressure booster supplies pressurized fluid to both brake circuits.

FIG. 2 shows a particularly simple dual circuit brake system of the inventive type. This design, which entails low manufacturing effort, both controls the brake force distribution and performs brake slip control when a locked condition is imminent.

Again, two diagonal split-up hydraulic brake circuits 31, 32 have been chosen. In this case, both brake circuits are supplied by an open-center booster 33. Open-center booster 33 is substantially composed of a throttle-valve circuit 34 and a single-type master cylinder 35. The driver's pedal force F acting upon booster 33 is symbolized by an arrow. One diagonal brake circuit 31 is connected to the throttle-valve circuit 34, and the other diagonal brake circuit 32 is connected to master cylinder 35. A pump 36, which for instance starts upon brake pedal depression, acts on both brake circuits 31, 32 to deliver auxiliary energy.

Pump 36, electromotively driven by a motor M, connects on its suction side to a pressure fluid reservoir 37 and on its pressure side to booster 33. A pressure-relief valve 38, connected between the pump's pressure side and the pump's suction side, serves to limit the pressure delivered.

For the controlled build-up of the braking pressure in the brake cylinders of the right and the left rear wheels $RW_r$ and $RW_l$, again a two-way/two-position directional control valve 39, 40 is respectively inserted into each hydraulic brake circuit 31 and 32. Rear inlet valves 39 and 40 can function as pressure modulators. When valves 39 and 40 are de-energized, the passages through them are closed. As will be seen below, this arrangement enables valves 39 and 40 to be energized in such a way that the brake force distribution, or the braking pressure build-up, in the rear wheels responds to both the braking pressure increase at the front wheels and the desired brake slip of the front wheels.

As shown in FIG. 2, to decrease the braking pressure when needed, rear-wheel brake cylinders 67 and 68 have a common outlet valve 41, which is a two-way/two-position directional control valve. Outlet valve 41 is connected to the two hydraulic brake circuits 31, 32 via two oppositely directed check valves 43 and 44. The other side of each valve 43, 44 connects up at a point between a respective inlet modulator valve 39, 40 and a respective rear wheel brake cylinder 67, 68. These check valves 43 and 44 prevent coupling between the two hydraulic brake circuits. Outlet valve 41 is closed in the pressure-build-up phase and in the phase when the pressure is maintained constant. As soon as it is electrically energized, outlet valve 41 connects both hydraulic brake circuits to the supply reservoir 37.

Thus, energization of valve 41 enables the pressure at the rear wheels to be decreased to the pressure level desired for safe braking.

When a locked condition is imminent at the front wheels $FW_l$ and $FW_r$, it is counteracted by a pressure decrease in the two brake circuits 31 and 32. This is done by reducing the auxiliary force which boosts the pedal force F. The pressure is decreased by "short-circuiting" the hydraulic circuit of pump 36 by another normally open two-way/two-position directional control valve 42. When switched over by electric actuation, valve 42 connects the pressure side of pump 36 to fluid reservoir 37.

In the embodiment of FIG. 2 the way of obtaining and combining the control and regulating signals is basically like that used in the embodiment of FIG. 1. Inductive transducers or sensors $S_1$ through $S_4$ supply measured values corresponding to the wheel rotational behavior to an electronic circuit block 45. Circuit block 45 prepares, combines and processes these inputs to form suitable control signals for the two-way/two-position directional control valves 39, 40, 41 and 42. This electronics can be conveniently composed of integrated, hard-wired, or programmed control circuits, for instance those using microcontrollers. If desired, further sensors may be connected at circuit block 45, for example a translational deceleration sensor for the determination of the vehicle velocity.

The mode of operation of the brake system of FIG. 2 is similar to that of FIG. 1. The special features are then employment of an open-center booster 3 and the short-circuiting of the auxiliary force by a single valve 42. How these affect both brake circuits 31 and 32 will be explained by way of FIG. 3.

First consider normal brake actuation, i.e., prior to the commencement of brake slip control. The two-way/two-position directional control valves 41 and 42 of FIG. 2 remain closed, out of function. Upon brake pedal depression, a boosted braking pressure is introduced into the hydraulic brake circuits 31 and 32 by the two outlets of the power brake booster 33. This occurs with the aid of the auxiliary energy source, i.e. the pump assembly 36. The boosted power acts directly on the front wheel brake cylinders 65 and 66, but it acts indirectly on the two rear wheels via the normally closed modulator valves 39 and 40, which are actuated (opened) by the control electronics 45. For example, in this arrangement, the modulator valves 39 and 40 are pulsed.

When a tendency of a rear wheel to lock is signaled, the electronics 45 causes common outlet valve 41 to open, preferably pulsewise for a duty period calculated for the desired pressure decrease. The electronics 45 simultaneously maintains valves 39 and 40 de-energized, and thus in the closed position. As a result of the common outlet 41, the braking pressure at both rear wheels $RW_l$ and $RW_r$ decreases at the same time.

The embodiment of FIG. 1 enables the braking pressure at the rear wheels to be independently decreased via valves 16 and 18, but the embodiment of FIG. 2 does not. Such independence is dispensable, since if needed a new pressure build-up could be brought about immediately in one of the two brake circuits by activating (opening) the corresponding inlet valve 39 or 40 controlling the pressure build-up. However, aiming at particularly little manufacturing effort, the embodiment of FIG. 2 dispenses with a renewed pressure build-up in the brake circuit 32 connected to the master cylinder 35.

In this circuit, in the most simple embodiment, no pressure medium can be supplied from the auxiliary energy source during the control phase. Because a means for renewed pressure build-up during the control phase is not provided in one of the two brake circuits, the stopping distance will slightly increase, but only in particularly unfavorable cases.

Suppose circuit block 45 determines from data sensed at a front wheel $FW_l$ or $FW_r$ that a locked condition is imminent. Circuit block 45 then effects a pressure decrease in the booster circuit, or in the circuit feeding the booster 33 with auxiliary energy, by a pulsating actuation of valve 42, or by switching over of the solenoid valve 42 several times. Then when the solenoid valve 42 is switched back to assume its initial "closed" position, a pressure proportional to the pedal force F rebuilds in the booster circuits.

As can be seen from the pressure-force diagrams in FIG. 3, when the brake pedal is pressed with a pedal Force F, first (i.e. prior to energization of the valve 42) the same pressure P will develop in both hydraulic brake circuits. This only happens if pressure P is below the operating pressure limit $P_A$ of the power brake booster. The brake system is dimensioned such that at first the braking pressure $P_{V1}$ in the brake valve circuit 31 approximately corresponds to the braking pressure $P_{HZ1}$ at the outlet of the master cylinder 35, i.e. the pressure in brake circuit 32. Hence, the relationship $P_{V1} = P_{HZ1}$ applies. The auxiliary force is then decreased by an intermittent, e.g. timed, changing over (opening) of the valve 42. A reduced braking pressure $P_{V2}$ occurs in the brake circuit 31. In contrast, a higher pressure $P_{HZ2}$ remains in the brake circuit 32 on account of the pedal force $F_p$ continuing to act on the master cylinder circuit. That is to say, in this embodiment, with the brake pedal depressed the pressure at the left front wheel $FW_l$ will not be decreased by the opening of valve 42 as much as the pressure at the right front wheel $FW_r$.

As shown in FIG. 3, when the pressure across the pump is completely balanced, i.e. $P_{V3} = 0$, a pressure $P_{HZ3} > 0$ will still be maintained in the brake circuit 32, i.e. the master cylinder circuit. The residual pressure $P_{HZ3}$ is caused by the driver's applied pedal force $F_p$. If necessary, this residual pressure $P_{HZ3}$ can be decreased or equalized completely by opening switch valve 40.

As need not be described herein in more detail, the failure of a brake circuit can be recognized without difficulty from the variation of the signals of sensors $S_1$ through $S_4$. If this happens, the brake slip control routine will then promptly be disabled. Brake force distribution by means of rear inlet valves 39 and 40 may then continue in operation insofar as the construction elements required therefore are still intact.

FIG. 4 shows the basic design of the open-center power brake booster 33 employed in the embodiment of FIG. 2. This booster works as an open-center booster in conjunction with an associated auxiliary energy source, such as a pump. Brake fluid pressure booster 33 is composed substantially of a single-type master cylinder 60 and a throttle valve 47, both of which are controlled by the pedal force F. Master cylinder 60 comprises a working chamber 54 and a master-cylinder piston 46. Left 49 and right 50 compression springs are selected to maintain the push rod 48 and the piston 46 in their right-hand initial position as long as there is no pedal force F.

The auxiliary energy source is composed of the pump 36 (compare FIG. 2). The pump obtains its driving energy from an electric motor M. Preferably, a self-regulating pump will be used, as is symbolized by the arrow 51 in FIG. 4. The self-regulation helps conform the delivery characteristics of the pump to the requirements of the system. A suction valve 52 is provided in case the pump's fluid delivery is insufficient when the brake pedal is depressed extremely fast. In such a case, a disadvantageous pressure below atmospheric pressure might result without suction valve 52. A pressure-limiting valve 38 (compare FIG. 2) limits the feed pressure of pump 36. The minimum pressure of response will be suitably chosen to be equal to or slightly higher than the booster's operating pressure limit $P_A$ (see FIG. 3). A pump start-up by-pass valve 53 is provided to ensure rapid start-up of the pump against pressure. The pump's direct-current motor M will be put into operation by a brake switch (not shown). For safety reasons the return or supply reservoir 37 contains two or three separate compartments.

Instead of an open-center booster which obtains its auxiliary energy from a pump assembly, a conventional electromechanical power brake booster could be used. In this design variant, the decrease in the auxiliary energy needed to reduce the braking pressure at the front axle could be realized by electric switching arrangements. Such switching arrangements would, for example, have to control the supply voltage of the electric driving motor or would have to take effect on the exciter coils in an appropriate fashion.

What is claimed is:

1. A hydraulic brake system for automotive vehicles having front and rear wheels with wheel brakes and said system having brake slip control wherein braking pressure modulators provide control of the brake force distribution onto the front and rear wheels as a function of the brake slip of the front wheels and which modulators provide brake slip control which prevents locking of at least one wheel upon the occurrence of an imminent locked condition of at least one wheel, said brake system comprising, in combination:
   - a pedal-actuated braking pressure generator including a master cylinder having a piston and a working chamber therein and said generator including a pedal-responsive throttle valve in a second chamber therein;
   - a first normally closed directional control valve serving as a pressure modulator connected between said working chamber and a first rear wheel brake;
   - a first pressure fluid line connected between said working chamber and a first front wheel brake;
   - a second normally closed directional control valve serving as a pressure modulator connected between said second chamber and a second rear wheel brake;
   - second pressure fluid line connected between said second chamber and another front wheel brake;
   - a pressure fluid reservoir;
   - an auxiliary pressure source having an input connected to said reservoir and having an output connected to said second chamber;
   - a third normally closed directional control valve connected between said reservoir and said rear wheel brakes and means connecting each rear wheel to said third valve for preventing direct pressure fluid flow between said first and second rear wheel brakes;
   - a fourth normally closed directional control valve connected between said output of said pump and said reservoir for increasing or decreasing the pressure from said pump to said second chamber;
   - a plurality of wheel sensors respectively coupled to said vehicle for providing electrical signals indicative of wheel rotational behavior;
   - means coupled to said sensors for providing output signals indicative of wheel rotational behavior; and,
   - means responsive to said output signals for controlling said directional control valves wherein:
   - said control means controlling said directional control valves such that during normal brake actuation prior to commencement of brake slip control said third and fourth directional control valves remain closed; upon an imminent locked condition being sensed at a rear wheel said third directional control valve is opened while said first and second directional valves remain closed; and, upon an imminent locked condition being sensed at a front wheel said fourth directional control valve is opened.

2. The brake system according to claim 1, wherein said first front wheel brake and said first rear wheel brake are diagonally opposite each other.

3. The brake system according to claim 1, wherein said second chamber communicates with said reservoir by way of a channel extending through said piston and forming a valve seat at its opening into said second chamber and wherein a pedal-driven valve member closes said valve seat upon brake actuation.

4. The brake system according to claim 1, wherein said means for connecting each rear wheel to said third directional control valve includes two valves respectively connected between said reservoir and one of said rear wheel brakes thereby preventing said pressure fluid flow between said first and second rear wheel brakes.

* * * * *